United States Patent
Roth et al.

[11] Patent Number: 6,160,059
[45] Date of Patent: Dec. 12, 2000

[54] BULK POLYMERIZATION PROCESS FOR PREPARING SOLID ACRYLIC RESIN

[75] Inventors: George Roth, Homewood, Ill.; George A. Smith, Newtown, Pa.; Reuben Grinstein, Tucson, Ariz.; Paul D. Whyzmuzis, deceased, late of Hatfield, Pa., by Carol A. Whyzmuzis, executrix; Shruti Singhal, Conshohocken, Pa.; Steve Boucher, Hatfield, Pa.; Roger Lovald, Amery, Wis.; David Devore, Langhorne, Pa.; Stephen A Fischer, Franklin, Wis.; Michael S. Wiggins, Lansdale, Pa.

[73] Assignee: Cook Composites and Polymers Co., Kansas City, Mo.

[21] Appl. No.: 08/948,714

[22] Filed: Oct. 10, 1997

Related U.S. Application Data

[63] Continuation-in-part of application No. 08/686,860, Jul. 26, 1996, abandoned.

[51] Int. Cl.[7] ................ C08F 20/06; C08F 2/02
[52] U.S. Cl. ............ 526/64; 526/227; 526/230; 526/317.1; 526/318.6
[58] Field of Search .................. 526/64, 318.6, 526/227, 230, 317.1; 528/501

[56] References Cited

U.S. PATENT DOCUMENTS

| | | | |
|---|---|---|---|
| 3,035,033 | 5/1962 | Schweitzer, Jr. et al. | 526/318.6 X |
| 3,141,870 | 7/1964 | Deex | 526/318.6 X |
| 4,713,434 | 12/1987 | Sutterlin et al. | 526/2 |
| 4,948,847 | 8/1990 | Morita et al. | 526/64 |
| 5,194,525 | 3/1993 | Miura et al. | 526/64 |

*Primary Examiner*—Fred Teskin
*Attorney, Agent, or Firm*—Whyte Hirschboeck Dudek SC

[57] ABSTRACT

Described is a process for making acrylic resins suitable as polymeric surfactants used in emulsion polymerization, as pigment grinding resins and for preparing dispersions used as overprint varnishes. The feedstock is styrene, α-methyl styrene, acrylic acid and a polymerization initiator and is preferably free of solvent. This mix is passed through a continuous tube reactor run at a controlled range of pressure and relatively low residence time and temperature. Optimally, when the polymer/unreacted monomers blend exits the reactor and is devolatilized, the recovered monomers are used to make up part of the feedstock.

32 Claims, No Drawings

BULK POLYMERIZATION PROCESS FOR PREPARING SOLID ACRYLIC RESIN

CROSS-REFERENCE TO RELATED APPLICATIONS

This application is a continuation-in-part of, and claims priority of, prior application Ser. No. 08/686,860 filed on Jul. 26, 1996 now abandoned, the contents of which are incorporated herein by reference.

FIELD OF THE INVENTION

The field of this invention is a process for making acrylic resins suitable as polymeric surfactants used in emulsion polymerization, as pigment grinding resins and for preparing dispersions used as overprint varnishes.

BACKGROUND OF THE INVENTION

Poly($\alpha$-methyl styrene-co-acrylic acid-co-styrene) and poly(styrene-co-acrylic acid-co-methacvrylic acid), acrylic resins, are used as a polymeric surfactant in emulsion polymerizations, as a pigment grinding resin and for preparing dispersions used to make overprint varnishes. In use, the resins are suspended in water and made into a dispersion, also known as a latex, by neutralizing them with a base such as 28% ammonium hydroxide. The base allows the acrylic resin to form polymeric surfactant micelles which have two chief advantages over solvent based systems. Firstly, they have lower viscosity, which is especially evident in high-solids systems. More importantly, however, is that being substantially solvent free, they are more environmentally friendly than solvent-based systems.

Typically, the acrylic resin has been made by bulk polymerization in a continuous-stirred tank reactor (CSTR). The CSTR is charged with styrene or styrene plus $\alpha$-methyl styrene, (meth)acrylic acid, a polymerization initiator and a solvent or just with styrene, $\alpha$-methyl styrene and (meth)acrylic acid. Reaction temperatures range from 180° C. to 300° C. and residence times are from 1 to 60 minutes. Of course, level control is very important. However, pressure is not controlled. The once-through percent conversion is on the order of 75%. The acrylic resin/unreacted monomer reaction product is sent to a devolatilizer for stripping of unreacted monomers for reuse. What emerges from the devolatilizer is the desired acrylic resin, suitable for flaking, pelletizing, pulverization, etc.

Heretofore, it has been believed that the reaction pressure appears to have no significant effect on the yield, and hence, pressure has not been controlled. Also, the use of tubular reactors for the bulk polymerization of styrenics has been taught away from because of problems encountered in thermal runaway reactions at 297° C., which resulted in resins having unacceptably large polydispersion. Past suggestions for avoiding this problem include the use of CSTRs with installed internal cooling coils.

The continuous tube reactor (CTR), also known as the linear flow reactor, has seen wide use in polymerizations because of its simplicity. No level controls are required, and because there is no stirring, there is no need for expensive, rotating seals capable of withstanding the pressure, temperature and solvent effects of the reaction. In the case of acrylics, it has been used in suspension polymerizations; the monomers employed are usually water soluble.

Note that all quantities appearing hereinafter, except in the examples are to be understood as being modified by the term "about." Also, all percentages are weight percentages unless indicated otherwise.

SUMMARY OF THE INVENTION

The invention is a bulk polymerization process for preparing a solid acrylic resin, which comprises the steps of: charging into a continuous tube reactor, a feedstock of at least one vinylic monomer and a polymerization initiator; maintaining a flow rate through the reactor sufficient to provide a residence time of the feedstock in the reactor of from one minute to one hour; maintaining a pressure of 80 psig to 500 psig; maintaining the resulting molten resin mixture with a heat transfer medium within the range from 180° C. to a maximum of 260° C.; and devolatilizing the molten resin mixture exiting the reactor to remove unreacted monomers to provide a solid acrylic resin upon cooling. A preferred embodiment comprises the additional step of recycling the unreacted monomers recovered during the devolatilization step and charging them into the continuous tube reactor as a fraction of the feedstock.

Unexpectedly, the consequences of thermal runaway, mentioned as a concern in the prior art, may be avoided by limiting the reaction pressure and allowing vapor formation.

Another surprise is that the yield is a strong function of the pressure when acrylic resin is made in a CTR. Conversion can be made to vary from 60% to 99% by varying the pressure.

Unforeseen also, was that coatings derived from resin made with recycled monomer showed an improved property, gloss on white, when compared to those derived from virgin monomer, as well as when compared to the closest commercial alternate resin.

An environmental benefit of the invention is that, for many embodiments, no solvent is required to make the resin and coating systems made from it are predominantly water based, rather than solvent based.

DETAILED DESCRIPTION OF THE INVENTION

The monomers are polymerized using a single-pass flow-through tubular reactor. A monomer blend and a polymerization initiator blend are separately introduced and then combined via stainless steel tubing. Prior to combination, the monomer blend may be preheated by pumping through a preheating section of tubing which is dipped into an oil bath set for a preselected temperature. The preheating ensures that the temperature of the monomer blend will be increased to a desired initiation temperature level prior to entering the tubular reactor. The preheating step is not essential to the process. The combined flows then enter a static mixer where the two streams are homogeneously mixed. At this point a small amount of initiation may occur if the monomer blend is preheated. After exiting the static mixer, the combined flows then enter the tubular reactor. The reactor consists of a single tube or a series of tubes of increasing diameter bound in a coil with a single pass. The tubes are plain with no static mixer or other mixing elements therein or in combination therewith after the combined flows enter the tubular reactor. The coil is immersed into a circulating oil bath preset at the desired temperature. Initiation and polymerization occur as the combined flows enter the tubular reactor, conversion is high and the reaction is essentially complete as evidenced by the presence of polymerized resin. Unexpectedly, the single-pass flow-through tubular reactor will efficiently accomplish the desired result under the stated conditions.

The particular reactor used for the following examples is constructed of five 20 foot lengths of ½ inch outside diameter (O.D.) tube, three lengths of 20 foot ¾ inch O.D. tube and two lengths of 1 inch O.D. tube, all 18 gauge 316 stainless steel. They are joined in series and contained in a shell that is 21 feet long and 8 inches in diameter which contains recirculating hot oil as the heat transfer medium.

The design details are not particularly critical, and the reactor size can be scaled up or down within limits. However, the back pressure of the reactor is sensitive to the tube diameter, length and roughness, the number and radii of the connections as well as the changing rheological properties of the reaction mixture as it is converted to polymer as it travels the length of the tubing. These are computationally intractable and the optimal pressure control for each reactor design must be developed experimentally as the conversion rate, as will be seen, is a strong function of the pressure in a CTR. The minimum pressure, which is 80 psig, should be higher than the vapor pressures of the monomers at the heating oil temperature. The upper bound will depend on the hoop strength of the tubing used, the upper bound determined by economics and poor heat transfer, it may be reasonable to expect this to be 500 psig. For the reactor described, the optimal pressure range is from 100 to 300 psig. In this range, the conversion can vary from 60% to 99%.

In terms of mode of operation of the invention, it may be speculated that in a CSTR the pressure is not a variable independent of the temperature because a CSTR will have a headspace filled with vapor in thermodynamic equilibrium with the monomers. While not completely understood, the pressure in a CTR may be a variable that is at least partially independent of the temperature. While the formation of at least some vapor phase has been observed through a transparent tube reactor as transient foaming at the initiation of polymerization, it has been suggested that perhaps the continuous dynamic phase change in the CTR inhibits the establishing of thermodynamic equilibrium within the reactor. Beyond this, it can only qualitatively be stated that lower pressures increase vapor fraction and therefore reduce the residence time, hence the conversion. In order to obtain acceptable conversion and properties, the pressure should be simultaneously optimized with both temperature and residence time.

If the heat transfer fluid temperature is controlled to a maximum of 260° C. (500° F.), then it is possible to use a CTR to make acrylic resin without the danger of thermal run-away. Nor is there need for internal cooling coils and their inherent thermodynamic inefficiency. The lower bound for the temperature is 180° C. At this temperature, conversion is so slow that residence times become uneconomically long and the viscosities are too high to handle. The preferred temperature range for this reactor and monomer/initiator mixture is from 204° C. (400° F.) to 260° C. (500° F.); more preferred is 210° C. (410° F.) to 246° C. (475° F.). It may reasonably be expected that a longer tube will require lower temperature for equal conversion, while larger O.D. or thicker walls might necessitate higher temperatures. Note that while the heat transfer fluid is limited to 260° C., the stream at the reactor exit can be as high as 271° C.

The residence time lower limit is bounded by 1 minute, conversion being low. On the upper end there are diminishing returns on percent conversion as well as economic waste for needless dwell time; this limit is 1 hour. Also, polymer properties suffer at higher residence times. The preferred dwell time for this reactor is optimized simultaneously with the pressure and temperature, as described above, and is 150 to 250 seconds.

While no solvent is required, solvent can, of course, be added. Glycol ethers are the class of solvents most commonly encountered; diethylene glycol monoethylether and diethylene glycol dimethyl ether are examples and they are typically used at levels of up to 25%.

The feedstock should comprise at least one unreacted vinylic monomer. It is further preferred that the feedstock comprises a blend of vinylic monomers containing at least one acrylic monomer and at least one monoalkenyl aromatic monomer. Monoalkenyl aromatic monomers that can be used include vinyl toluene, para-methyl-styrene, tert-butyl-styrene and chlorostyrene, but preferred are styrene and α-methyl-styrene. Acrylic monomers that may be used include acrylic, methacrylic acid, crotonic acid and their esters and derivatives and maleic anhydride. Among them are butyl acrylate, 2-ethylhexylacrylate, 2-ethylhexylmethacrylate, methylmethacrylate, hydroxyethylmethacrylate and the like. Acrylic and methacrylic acid are preferred. The preferred blends comprises styrene, α-methyl styrene and acrylic acid and styrene, acrylic acid and methacrylic acid. Styrene and α-methyl styrene are hydrophobic, while (meth)acrylic acid is hydrophilic, especially when neutralized to a salt. In order to produce a dispersible polymeric surfactant, the hydrophobic portion must have a certain balance with the hydrophilic portion. Pure acrylic acid would result in polyacrylic acid, which forms a true solution in water, rather than a dispersion. Pure polystyrene or poly(styrene-co-α-methyl styrene) will not disperse in water because it has no hydrophilic functionality, nor an acid group whose hydrophilicity can be increased via neutralization. The composition range of styrene plus α-methyl styrene versus (meth)acrylic acid that has produced successful dispersions is 50 to 80 wt. % styrene plus α-methyl styrene and 18 to 40 wt. % (meth)acrylic acid, balance being initiator and any solvent. The ratio of styrene to α-methyl styrene is broader, as both are of the same character, hydrophobic, and may vary from 2.5:1 to 20:1. In terms of mole % of the monomers, the preferred ranges are 25 to 60% styrene, 2 to 35% alpha-methyl styrene and 25 to 50% acrylic acid.

With respect to the styrene, acylic acid and methacrylic acid embodiment, ratios of 1:2:1, 1:1:1 and 1:3:1 mole ratios are possible, giving a range of styrene:(methacrylic acid) of 1:2 to 1:4 moles.

Recycling of the monomers recovered from the reaction mass exiting the reactor as distillate from the devolatilization step is a preferred embodiment. As will be seen in the examples, the properties of the acrylic resins so produced, especially glossiness of the coatings made therefrom, are significantly improved. Typically, 10 wt. % of the feed consists of recycled monomer, however, at least 80 wt. % of the recovered monomers can be recycled. The recycled monomers may require pre-processing such as purification.

The polymerization initiator is of the free radical type with a half-life ranging from 1 to 10 hours at 90 to 100° C. Preferred are initiators with half-lives of 10 hours at 100° C. Initiators of this sort may be azo-type, such as azo-bis isobutyronitrile (AIBN), 1-tert-amylazo-1-cyanocyclohexane and 1-tert-butylazo-1-cyanocyclohexane. They may also be peroxides and hydroperoxides such as tert-butylperoctoate, tert-butylperbenzoate, dicumyl peroxide and tert-butyl hydroperoxide. Preferred are di-tert-butyl peroxide and cumene hydroperoxide. The quantity of initiator typically used ranges from 0.0005:1 to 0.06:1 moles initiator per mole monomer. When di-tert-butyl peroxide is used it is preferred that it is at 0.002 to 0.05 mole ratio, preferably from 0.003 to 0.04 mole ratio. For the styrene, acrylic acid and methacrylic acid embodiment, 1 part by weight per hundered monomer of di-tert-butyl peroxide has been found useful.

Once the reaction product exits the CTR, it is devolatilized to separate the molten acrylic resin, which can be flaked or pelletized after cooling. This then can be used to prepare dispersions. A typical formula would be prepared as follows:

Charge #1 is 201.52 g acrylic resin, 102.16 g de-ionized (DI) water, 4.99 g Dowfax 2A1 and 5.17 g Triton X-100 surfactant; adjust to a pH of 8.71 with ca. 3 g ammonium hydroxide.

Charge #2 is 146.58 g styrene and 27.60 g 2-ethylhexylacrylate.

Charge #3 is 1.99 g ammonium persulfate and 5.30 g DI water.

Charge #4 is 1.24 g t-butyl hydroperoxide (70%).

Charge #5 is 0.70 g sodium ascorbate and 8.00 g DI water.

At t=0 min., T=23° C., apply a nitrogen blanket, charge #1 and start heating. Note that the reactor is blanketed with nitrogen to quench any free radicals present; nitrogen is not involved in the actual resin chemistry in any way.

At 38 min. 80° C., charge 16.79 g #2.
At 43 min., 82° C., charge #3.
At 53 min., 85° C., start monomer #2.
At 118 min., 84° C., complete addition of monomer #2.
At 183 min., 84° C., charge #4 and ⅓ of #5.
At 188 min., 84° C., charge ⅓ of #5.
At 193 min., 84° C., charge remainder of #5.
At 198 min., remove and allow to cool.

Normally, the above would be augmented with preservatives, dyes, pigments, thixotropes, perfumes, wetting agents, antifoams, coalescing agents, slip aids and the like prior to use.

Examples 1 through 10 explore variations of the reaction parameters, particularly pressure, on the percent conversion (one-pass yield) and the properties of coatings made from dispersions prepared from the acrylic resins produced by the CTR. Example 11 describes a preferred embodiment, wherein the monomers are recycled and surprisingly form a product not only better than that had from virgin monomers, with respect to gloss on white, but also superior to the nearest commercial equivalent, Joncryl 678. Joncryl's properties as a control are shown in example 1. Example 12 shows the effect of varying monomer ratios on the yield obtained, as well as the highest yield obtained. All percents are weight percents and all molecular weights are weight average.

EXAMPLE 1

29.1% styrene, 40.9% α-methyl styrene, 29.5% acrylic acid and 0.5% di-tertiary butyl peroxide (the "feedstock") was passed through a continuous tube reactor. The residence time was 200 seconds, the pressure was 140 psig and the temperature was 232° C. (450° F.). The conversion was 77.6%. The acrylic resin/unreacted monomer blend was devolatilized. The resulting resin had a weight average molecular weight of 7913, an acid value of 253 and a glass transition temperature (Tg) of 117° C. A control sample of Joncryl 678 (trademark, S. C. Johnson Co.) was measured and found to have a weight average molecular weight of 9000, an acid value of 224 and a glass transition temperature (Tg) of 117° C. The composition of Joncryl 678 is believed to be 30% styrene, 40% α-methyl styrene and 30% acrylic acid. A dispersion was made from the experimental resin by the technique described above but neutralizing to pH 9.32. The final dispersion was 49.02% solids. Its viscosity was 530 cps, the particle size was 94.1 nm, while the gloss on black was 91.3 and the gloss on white was 82. The coatings were evaluated for gloss by conventional means, i.e. simply measuring within a Macbeth Novo-Gloss meter the visible light reflected from the surface at the same angle (i.e. 60 degrees) as the incident angle of the light. The values expressed are for an average of several measurements. A similar dispersion made from the Joncryl 678 to 49.13% solids and a pH of 8.40. The dispersion had a viscosity of 340 cps, a particle size of 55.7 nm, gloss on black of 92.0 and a gloss on white of 102.0.

EXAMPLE 2

The same feedstock was used as in experiment 1. The residence time was 250 seconds, the pressure was 150 psig and the temperature was 238° C. (460° F.). The conversion was 81.8%. The resulting resin had a weight average molecular weight of 7582, an acid value of 249 and a glass transition temperature (Tg) of 114° C. The dispersion was made as above, neutralized to pH 9.34. The final dispersion was 49.98% solids. Its viscosity was 510 cps, the particle size was 83.2 nm, while the gloss on black was 95.8 and the gloss on white was 75.1.

EXAMPLE 3

The same feedstock was used as in experiment 1. The residence time was 150 seconds, the pressure was 130 psig and the temperature was 238° C. (460° F.). The conversion was 61.8%. The resulting resin had a weight average molecular weight of 8098, an acid value of 255 and a glass transition temperature (Tg) of 127° C. The dispersion was made as above, neutralized to pH 9.10. The final dispersion was 49.48% solids. Its viscosity was 875 cps, the particle size was 74.5 nm, while the gloss on black was 93.5 and the gloss on white was 94.6.

EXAMPLE 4

The same feedstock was used as in experiment 1. The residence time was 250 seconds, the pressure was 130 psig and the temperature was 238° C. (460° F.). The conversion was 75.4%. The resulting resin had a weight average molecular weight of 8096, an acid value of 254 and a glass transition temperature (Tg) of 120.57° C. The dispersion was made as above, neutralized to pH 9.34. The final dispersion was 49.98% solids. Its viscosity was 440 cps, the particle size was 90.1 nm, while the gloss on black was 93.5 and the gloss on white was 75.0.

EXAMPLE 5

The same feedstock was used as in experiment 1. The residence time was 150 seconds, the pressure was 150 psig and the temperature was 238° C. (460° F.). The conversion was 65.9%. The resulting resin had a weight average molecular weight of 7518, an acid value of 257 and a glass transition temperature (Tg) of 124° C. The dispersion was made as above, neutralized to pH 9.48. The final dispersion was 51.24% solids. Its viscosity was 1350 cps, the particle size was 65 nm, while the gloss on black was 95.8 and the gloss on white was 71.6.

EXAMPLE 6

The same feedstock was used as in experiment 1. The residence time was 250 seconds, the pressure was 130 psig and the temperature was 227° C. (440° F.). The conversion was 82%. The resulting resin had a weight average molecular weight of 8339, an acid value of 250 and a glass transition temperature (Tg) of 128° C. The dispersion was made as above, neutralized to pH 8.70. The final dispersion was 47.85% solids. Its viscosity was 303 cps, the particle size was 71.9 nm, while the gloss on black was 95.1 and the gloss on white was 88.6.

EXAMPLE 7

The same feedstock was used as in experiment 1. The residence time was 150 seconds, the pressure was 150 psig and the temperature was 227° C. (440° F.). The conversion was 72.2%. The resulting resin had a weight average molecular weight of 7093, an acid value of 256 and a glass transition temperature (Tg) of 118° C. The dispersion was made as above, neutralized to pH 8.44 The final dispersion was 50.38% solids. Its viscosity was 535 cps, the particle size was 65.0 nm, while the gloss on black was 95.1 and the gloss on white was 85.9.

EXAMPLE 8

The same feedstock was used as in experiment 1. The residence time was 250 seconds, the pressure was 150 psig and the temperature was 227° C. (440° F.). The conversion was 86.4%. The resulting resin had a weight average molecular weight of 7809, an acid value of 249 and a glass transition temperature (Tg) of 111° C. The dispersion was made as above, neutralized to pH 8.35. The final dispersion was 48.61% solids. Its viscosity was 323 cps, the particle size was 79.6 nm, while the gloss on black was 94.8 and the gloss on white was 76.0.

EXAMPLE 9

The same feedstock was used as in experiment 1. The residence time was 150 seconds, the pressure was 130 psig and the temperature was 227° C. (440° F.). The conversion was 65.0%. The resulting resin had a weight average molecular weight of 7783, an acid value of 258 and a glass transition temperature (Tg) of 25° C. The dispersion was made as above, neutralized to pH 8.49. The final dispersion was 48.85% solids. Its viscosity was 595 cps, the particle size was 65.5 nm, while the gloss on black was 92.5 and the gloss on white was 99.5.

EXAMPLE 10

The same feedstock was used as in experiment 1. The residence time was 200 seconds, the pressure was 140 psig and the temperature was 232° C. (450° F.). The conversion was 75.4%. The resulting resin had a weight average molecular weight of 7944, an acid value of 253 and a glass transition temperature (Tg) of 114° C. The dispersion was made as above, neutralized to pH 8.54. The final dispersion was 49.15% solids. Its viscosity was 475 cps, the particle size was 72.9 nm, while the gloss on black was 95.6 and the gloss on white was 86.0.

EXAMPLE 11

The feedstock used was 90% that of experiment 1, plus 10% of the monomers recycled from the devolatilization step. The residence time was 150 seconds, the pressure was 130 psig and the temperature was 216° C. (420° F.). The conversion was 69.7%. A cut at the beginning of the run and again at the end of the run was taken. The resulting resin from one cut had a weight average molecular weight of 7913, an acid value of 253 and a glass transition temperature (Tg) of 117° C. The dispersion was made as above, neutralized to pH 8.48. The final dispersion was 48.00% solids. Its viscosity was 720 cps, the particle size was 66.6 nm, while the gloss on black was 91.92 and the gloss on white was 101.83. Note that the resin made with recycled monomers resulted in significantly higher gloss on white than that made with neat feedstock.

The resulting resin made from the other cut had a weight average molecular weight of 7582, an acid value of 249 and a glass transition temperature (Tg) of 114° C. The dispersion was made as above, neutralized to pH 8.13. The final dispersion was 48.30% solids. Its viscosity was 385 cps, the particle size was 75.5 nm, while the gloss on black was 93.24 and the gloss on white was 106.33. Note that the resin made with recycled monomers resulted in significantly higher gloss on white than that made with neat feedstock. Note also that the gloss on white, as well as the gloss on black, is superior to that obtained with the closest commercial equivalent, Joncryl 678.

EXAMPLE 12

The monomer portion of the feedstock consisted of 30% α-methyl styrene, while the ratio of acrylic acid:styrene (AA:Styrene) of the balance of the monomer was varied. Reactor pressure was 220 psig, while the residence time was 240 seconds and the heat transfer fluid temperature was 246° C. (475° F.). The results were:

| AA:Styrene | Tg (° C.) | Acid value | Mol. Wt. | % Conversion |
|---|---|---|---|---|
| 1.31 | 95 | 292 | 1910 | 81 |
| 1.17 | 89 | 261 | 1940 | 84 |
| 1.05 | 94 | 265 | 1923 | 85 |
| 0.93 | 90 | 246 | 1899 | 76 |
| 0.83 | 93 | 242 | 1930 | 91 |

EXAMPLE 13

The reaction conditions for this, and the remaining examples, are a reaction temperature of 410° F., a hot oil temperature set at 440° F. and pressure of 120 psig and a residence time of 3.3 minutes. Conversion was greater than 90% for this and the following examples. Styrene:acrylic acid:methacrylic acid was run at a 1:2:1 molar ratio (31.1:43.2:25.7 weight ratio) with 1 part by weight di-tert-butyl peroxide as the feedstock. The resulting polymer had a Tg of 112° C., a softening point of 162° C., a theoretical AV of 500, an experimental AV of 395, 1.6% residual monomer and a molecular weight of 10,000. A dispersion of the above resin was prepared by using 2 times the theoretical ammonia and then boiling off excess ammonia to pH 8–8.5 and adding DI water to compensate for loss.

EXAMPLE 14

Styrene:acrylic acid:methacrylic acid was run at a 1:3:1 molar ratio (25.6:53.2:21.2 weight ratio) with 1 part by weight di-tert-butyl peroxide as the feedstock. The resulting polymer had a Tg of 129° C., an experimental AV of 372, 5.06% residual monomer and a molecular weight of 10,400.

EXAMPLE 15

Styrene:acrylic acid:methacrylic acid was run at a 1:1:1 molar ratio (39.7:27.5:32.8 weight ratio) with 1 part by weight di-tert-butyl peroxide as the feedstock.

Although various embodiments of the invention are shown and described herein, they are not meant to be limiting, those of skill in the art may recognize various modifications to the embodiments, which modifications are meant to be covered by the spirit and scope of the appended claims.

What is claimed is:

1. A bulk polymerization process for preparing a solid acrylic resin, which comprises the steps of:
    (a) charging into a continuous tube reactor, a feedstock of at least one acrylic monomer and a polymerization initiator;
    (b) maintaining a flow rate through the reactor sufficient to provide a residence time of the feedstock in the reactor of from about one minute to about one hour;
    (c) maintaining a pressure of about 80 psig to about 500 psig;
    (d) maintaining the resulting molten resin mixture with a heat transfer medium at a temperature within the range from about 180° C. to a maximum of about 260° C.; and
    (e) devolatilizing the molten resin mixture exiting the reactor to remove unreacted monomers to provide a solid acrylic resin upon cooling.

2. The process of claim 1, further comprising an additional step of recycling the unreacted monomers recovered during the devolatilization step and charging them into the continuous tube reactor as a fraction of the feedstock.

3. The process of claim 2, wherein the recycled monomers comprise at least about 10 percent of the feedstock.

4. The process of claim 2, wherein the feedstock comprises about 27 wt. % styrene, about 36 wt. % α-methyl styrene, about 27 wt. % acrylic acid monomers and about 10 wt. % monomers recycled from the devolatilization step and a polymerization initiator level of about one-half part per hundred monomer.

5. The process of claim 1, wherein the pressure is from about 100 psig to about 300 psig.

6. The process of claim 1, wherein the temperature is from about 210° C. to about 246° C.

7. The process of claim 1, wherein the residence time is from about 150 to about 250 seconds.

8. The process of claim 1, wherein the initiator has a half-life of about 10 hours at 100° C.

9. The process of claim 1, wherein the initiator is a peroxide or a hydroperoxide.

10. The process of claim 1, wherein the initiator is employed in a mole ratio of from about 0.0005:1 to about 0.06:1 with respect to the monomers.

11. The process of claim 1, wherein the polymerization initiator level is about one-half part per hundred with respect to monomer weight.

12. The process of claim 1, wherein the polymerization initiator is di-tertiary butyl peroxide.

13. The process of claim 1, wherein the feedstock comprises at least one acrylic monomer and at least one monoalkenyl aromatic monomer and a polymerization initiator.

14. The process of claim 1, wherein the feedstock comprises styrene, α-methyl styrene, acrylic acid and a polymerization initiator.

15. The process of claim 1, wherein the feedstock comprises about 30 wt. % styrene, about 40 wt. % α-methyl styrene, about 30 wt. % acrylic acid and a polymerization initiator.

16. The process of claim 1, wherein the feedstock comprises styrene and α-methyl styrene at about 50–80% by weight, acrylic acid from about 15–40% by weight and a polymerization initiator.

17. The process of claim 16, wherein the styrene and α-methyl styrene have a weight ratio of about 2.5:1 to 20:1.

18. The process of claim 1, wherein the monomer portion of the feedstock comprises from about 25 to 60 mole % styrene, from about 2 to 35 mole % α-methyl styrene and from about 25 to 50 mole % acrylic acid.

19. A bulk polymerization process for preparing a solid acrylic resin, which comprises the steps of:
    (a) charging into a continuous tube reactor, a feedstock of styrene, acrylic acid and methacrylic acid and a polymerization initiator;
    (b) maintaining a flow rate through the reactor sufficient to provide a residence time of the feedstock in the reactor of from about one minute to about one hour;
    (c) maintaining a pressure of about 80 psig to about 500 psig;
    (d) maintaining the resulting molten resin mixture with a heat transfer medium at a temperature within the range from about 180° C. to a maximum of about 260° C.; and
    (e) devolatilizing the molten resin mixture exiting the reactor to remove unreacted monomers to provide a solid acrylic resin upon cooling.

20. The process of claim 19, further comprising an additional step of recycling the unreacted monomers recovered during the devolatilization step and charging them into the continuous tube reactor as a fraction of the feedstock.

21. The process of claim 20, wherein the recycled monomers comprise at least about 10 percent of the feedstock.

22. The process of claim 19, wherein the pressure is from about 100 psig to about 300 psig.

23. The process of claim 19, wherein the temperature is from about 210° C. to about 246° C.

24. The process of claim 19, wherein the residence time is from about 150 to about 250 seconds.

25. The process of claim 19, wherein the initiator has a half-life of about 10 hours at 100° C.

26. The process of claim 19, wherein the initiator is a peroxide or a hydroperoxide.

27. The process of claim 19, wherein the initiator is employed in a mole ratio of from about 0.0005:1 to about 0.06:1 with respect to the monomers.

28. The process of claim 19, wherein the polymerization initiator level is about one part per hundred with respect to monomer weight.

29. The process of claim 19, wherein the polymerization initiator is di-tertiary butyl peroxide.

30. The process of claim 19, wherein the mole ratio of the styrene:acrylic acid:methacrylic is about 1:1:1.

31. The process of claim 19, wherein the mole ratio of the styrene:acrylic acid:methacrylic is about 1:2:1.

32. The process of claim 19, wherein the mole ratio of the styrene:acrylic acid:methacrylic is about 1:3:1.

* * * * *

UNITED STATES PATENT AND TRADEMARK OFFICE
CERTIFICATE OF CORRECTION

PATENT NO. : 6,160,059

DATED : December 12, 2000

INVENTOR(S) : Roth, George, et al.

It is certified that error appears in the above-identified patent and that said Letters Patent is hereby corrected as shown below:

Column 7, line 35: Replace "25° C." with --125° C.--.

Signed and Sealed this

Twenty-ninth Day of May, 2001

Attest:

NICHOLAS P. GODICI

*Attesting Officer*  *Acting Director of the United States Patent and Trademark Office*